(12) United States Patent
Zhu et al.

(10) Patent No.: US 9,080,038 B2
(45) Date of Patent: *Jul. 14, 2015

(54) MIGRATION-FREE, HALOGEN-FREE, FLAME RETARDANT THERMOPLASTIC POLYURETHANE COMPOSITIONS

(75) Inventors: Journey Lu Zhu, Shanghai (CN); Bin Li, Shanghai (CN); Lan Lu, Glasgow (GB); Given Jing Chen, Shanghai (CN); Qin Deng, Shanghai (CN); Hong Fei David Guo, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/232,949

(22) PCT Filed: Aug. 31, 2011

(86) PCT No.: PCT/CN2011/079164
§ 371 (c)(1),
(2), (4) Date: Jan. 15, 2014

(87) PCT Pub. No.: WO2013/029250
PCT Pub. Date: Mar. 7, 2013

(65) Prior Publication Data
US 2014/0228490 A1    Aug. 14, 2014

(51) Int. Cl.
| | | |
|---|---|---|
| *C08K 5/523* | (2006.01) | |
| *C08L 75/04* | (2006.01) | |
| *C08K 3/22* | (2006.01) | |
| *C08G 18/48* | (2006.01) | |
| *C08L 75/08* | (2006.01) | |
| *C08K 5/521* | (2006.01) | |

(52) U.S. Cl.
CPC ............ *C08K 5/523* (2013.01); *C08G 18/4854* (2013.01); *C08K 3/22* (2013.01); *C08L 75/04* (2013.01); *C08L 75/08* (2013.01); *C08K 5/521* (2013.01); *C08K 2003/2227* (2013.01)

(58) Field of Classification Search
CPC .......... C08G 18/4238; C08G 18/4854; C08G 77/04; C08L 75/06; C08L 75/08; C08L 31/04; C08L 23/0853; C08K 3/22; C08K 3/0058; C08K 5/523; C08K 5/0066

USPC .......................................................... 524/127
See application file for complete search history.

(56) References Cited

U.S. PATENT DOCUMENTS

| | | | |
|---|---|---|---|
| 4,385,133 A | 5/1983 | Alberino et al. | |
| 4,522,975 A | 6/1985 | O'Connor et al. | |
| 5,167,899 A | 12/1992 | Jezic | |
| 6,404,971 B2 | 6/2002 | Mehl | |
| 8,865,808 B2 * | 10/2014 | Tai et al. | 524/114 |
| 2002/0006263 A1 | 1/2002 | Mehl | |
| 2013/0059943 A1 * | 3/2013 | Yan et al. | 523/423 |
| 2014/0234620 A1 * | 8/2014 | Zhu et al. | 428/373 |

FOREIGN PATENT DOCUMENTS

| | | | |
|---|---|---|---|
| CN | 101570632 A | * | 11/2009 |
| CN | 101624469 A | | 1/2010 |
| JP | 2003-086029 A | | 3/2003 |
| JP | 2009062450 A | * | 3/2009 |
| JP | 2010-006965 A | | 1/2010 |
| WO | 2010/012136 A1 | | 2/2010 |
| WO | 2011/011921 A1 | | 2/2011 |
| WO | 2011/069301 A1 | | 6/2011 |
| WO | 2011/120225 A1 | | 10/2011 |
| WO | WO 2011120225 A1 | * | 10/2011 |

OTHER PUBLICATIONS

English Machine Translation of CN101570632A.*
English Machine Translation of JP2009-062450.*
Machine translation of JP 2003-086029.
Machine translation of JP 2010-006965.

* cited by examiner

*Primary Examiner* — Randy Gulakowski
*Assistant Examiner* — Christopher M Rodd
(74) *Attorney, Agent, or Firm* — Whyte Hirschboeck Dudek S.C.

(57) ABSTRACT

Halogen-free, thermoplastic polyurethane-based compositions having good mechanical and flame-retardant properties are provided. The compositions include flame-retardant aromatic organic phosphate compounds that do not exhibit migration in molded products, such as cable and wire jacketing and insulation. The compositions include a continuous resin phase comprising a thermoplastic polyurethane elastomer, at least one aromatic organic phosphate flame retardant having a melting point of at least 50.

13 Claims, 1 Drawing Sheet

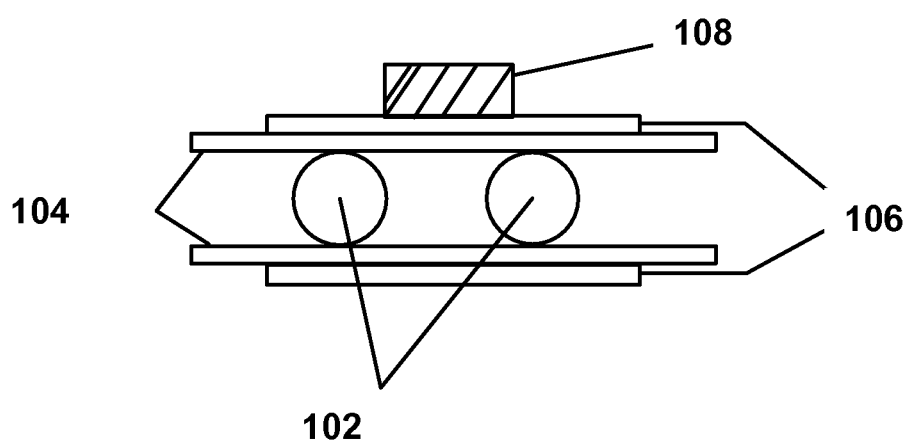

MIGRATION-FREE, HALOGEN-FREE, FLAME RETARDANT THERMOPLASTIC POLYURETHANE COMPOSITIONS

CROSS REFERENCE TO RELATED APPLICATION

The present application is the national phase of PCT Patent Application No. PCT/CN2011/079164 filed Aug. 31, 2011, the entire content of which is incorporated by reference herein.

BACKGROUND

Thermoplastic polyurethane (TPU) elastomers have a broad range of flexibility and can be fabricated by a variety of methods, from injection molding to extrusion and blow molding. They also offer the performance benefits of clarity, abrasion resistance, chemical and hydrocarbon resistance, load-bearing capabilities and high tensile strengths. Accordingly, they find use in many applications which require flame resistance. Traditional flame retardants used in TPU compositions contain halogens (the so-called halogenated flame retardants). However, due to the increasing concerns about the environment and safety, there is a greater need for non-halogenated flame retardant (HFFR) materials, which poses a significant challenge to TPU-based compositions.

Liquid organic phosphates (e.g. resorcinol bis(diphenyl phosphate) (RDP), or bisphenol-A bis(diphenyl phosphate) (BDP)) are commonly used in polymers to obtain HFFR formulations. However, products made with the HFFR TPU compositions containing liquid phosphates experience migration of the phosphate flame retardants over time and, therefore, are unable to meet the non-migration requirements for some applications, such as wire and cable jacketing and insulation.

SUMMARY

One aspect of the invention provides halogen-free, flame-retardant compositions comprising 10 to 89 weight percent, based on the total weight of the composition, of a continuous resin phase comprising a thermoplastic polyurethane; 1 to 10 weight percent, based on the total weight of the composition, of an aromatic organic phosphate flame retardant having a melting point of at least 50° C.; and 10 to 89 weight percent, based on the total weight of the composition, of an inorganic hydrate flame retardant. These compositions comprise no greater than 10 weight percent, based on the total weight of the composition, of a liquid organic flame retardants having a melting point of 25° C. or lower.

In some embodiments, the composition further comprises 1 to 10 weight percent, based on the total weight of the composition, of a liquid organic flame retardants having a melting point of 25° C. or lower.

In some embodiments, the compositions comprise 20 to 50 weight percent of a continuous resin phase comprising a thermoplastic polyurethane; 2 to 8 weight percent, based on the total weight of the composition, of an aromatic organic phosphate flame retardant having a melting point of at least 50° C., wherein the aromatic organic flame retardant is an aromatic polyphosphate; 30 to 50 weight percent, based on the total weight of the composition, of an inorganic hydrate flame retardant, and 2 to 8 weight percent of an organic flame retardant having a melting point of 25° C. or lower.

In some such embodiments, the compositions comprise an organic flame retardant having a melting point of 25° C. or lower, in which the weight percent of organic flame retardants having a melting point of 25° C. or lower is equal to, or lower than the weight percent of the aromatic organic phosphate flame retardant having a melting point of at least 50° C. In some such embodiments, the compositions are free of organic flame retardant having a melting point of 25° C. or lower.

At least some embodiments of the compositions are characterized in that a cable consisting of a composition in accordance with this invention does not exhibit migration after 48 hours at 50° C. and 80% relative humidity.

In some embodiments, the compositions have a heat deformation ratio, as measured by UL 1581-2001, of no greater than 20%.

In some embodiments, the compositions further comprise an epoxidized novolac resin.

In some embodiments, the compositions further comprise a polar polyolefin dispersed in, or co-continuous with, the continuous resin phase.

In some embodiments, the aromatic organic phosphate flame retardant having a melting point of at least 50° C. is high molecular weight resorcinol bis(diphenyl phosphate), resorcinol bis(dixylenyl phosphate), or a combination thereof.

In all the embodiments, the total percentages of all the components in the compositions are 100 wt %.

Another aspect of the invention provides jacketing or insulation for a wire or cable comprising a composition in accordance with the present invention.

BRIEF DESCRIPTION OF THE DRAWINGS

FIG. 1 is a schematic diagram of the set-up for the non-migration testing of the present compositions.

DETAILED DESCRIPTION OF THE PREFERRED EMBODIMENT

One aspect of the present invention provides a halogen-free, thermoplastic polyurethane-based composition having good mechanical and flame-retardant properties. The compositions include flame-retardant organic phosphorus compounds that do not exhibit migration in molded products, such as cable and wire jacketing. The compositions include a continuous resin phase comprising a thermoplastic polyurethane elastomer, at least one aromatic organic phosphate flame retardant having a melting point of at least 50° C. and an inorganic hydrate flame retardant. The aromatic organic phosphate flame retardant is a solid at room temperature in molded articles made from the present compositions and, as a result, these compositions provide improved non-migration properties relative to comparable flame-retardant compositions that use liquid organic phosphate flame retardants.

"Halogen-free" and like terms mean that the compositions are without or substantially without halogen content, i.e., contain less than 2000 mg/kg of halogen as measured by ion chromatography (IC) or a similar analytical method. Halogen content of less than this amount is considered inconsequential to the efficacy of the blend as, for example, a wire or cable covering.

The compositions are suited for use in a variety of molded thermoplastic articles, including jacketing and insulation for wires and cables, automobile parts, building and construction materials, toys, artificial leather, and electronic appliances and devices.

All melting points are determined by ASTM method D3418.

Thermoplastic Polyurethanes:

A "thermoplastic polyurethane" (or "TPU"), as used herein, refers to the reaction product of a di-isocyanate, one or more polymeric diol(s), and optionally one or more difunctional chain extender(s). The TPU may be prepared by the prepolymer, quasi-prepolymer, or one-shot methods. The di-isocyanate forms a hard segment in the TPU and may be an aromatic, an aliphatic, or a cycloaliphatic di-isocyanate and combinations of two or more of these compounds. A nonlimiting example of a structural unit derived from di-isocyanate (OCN—R—NCO) is represented by formula (I) below:

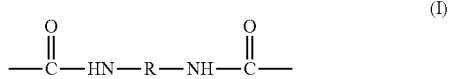

(I)

in which R is an alkylene, cycloalkylene, or arylene group. Representative examples of these diisocyanates can be found in U.S. Pat. Nos. 4,385,133, 4,522,975 and 5,167,899. Nonlimiting examples of suitable diisocyanates include 4,4'-di-isocyanatodiphenyl-methane, p-phenylene di-isocyanate, 1,3-bis(isocyanatomethyl)-cyclohexane, 1,4-di-isocyanato-cyclohexane, hexamethylene di-isocyanate, 1,5-naphthalene di-isocyanate, 3,3'-dimethyl-4,4'-biphenyl di-isocyanate, 4,4'-di-isocyanato-dicyclohexylmethane, and 2,4-toluene di-isocyanate.

The polymeric diol forms soft segments in the resulting TPU. The polymeric diol can have a molecular weight (number average) in the range, for example, from 200 to 10,000 g/mole. More than one polymeric diol can be employed. Nonlimiting examples of suitable polymeric diols include polyether diols (yielding a "polyether TPU"); polyester diols (yielding a "polyester TPU"); hydroxy-terminated polycarbonates (yielding a "polycarbonate TPU"); hydroxy-terminated polybutadienes; hydroxy-terminated polybutadiene-acrylonitrile copolymers; hydroxy-terminated copolymers of dialkyl siloxane and alkylene oxides, such as ethylene oxide, propylene oxide; natural oil diols, and any combination thereof. One or more of the foregoing polymeric diols may be mixed with an amine-terminated polyether and/or an amino-terminated polybutadiene-acrylonitrile copolymer.

The difunctional chain extender can be aliphatic straight and branched chain diols having from 2 to 10 carbon atoms, inclusive, in the chain. Illustrative of such diols are ethylene glycol, 1,3-propanediol, 1,4-butanediol, 1,5-pentanediol, 1,6-hexanediol, neopentyl glycol, and the like; 1,4-cyclohexanedimethanol; hydroquinonebis-(hydroxyethyl)ether; cyclohexylenediols (1,4-, 1,3-, and 1,2-isomers), isopropylidenebis(cyclohexanols); diethylene glycol, dipropylene glycol, ethanolamine, N-methyl-diethanolamine, and the like; and mixtures of any of the above. As noted previously, in some cases, minor proportions (less than about 20 equivalent percent) of the difunctional extender may be replaced by trifunctional extenders, without detracting from the thermoplasticity of the resulting TPU; illustrative of such extenders are glycerol, trimethylolpropane, and the like.

The chain extender is incorporated into the polyurethane in amounts determined by the selection of the specific reactant components, the desired amounts of the hard and soft segments, and the index sufficient to provide good mechanical properties, such as modulus and tear strength.

Optionally, small amounts of monohydroxyl functional or monoamino functional compounds, often termed "chain stoppers," may be used to control molecular weight. Illustrative of such chain stoppers are the propanols, butanols, pentanols, and hexanols.

Nonlimiting examples of suitable TPUs include the PELLETHANE™, ESTANET™, TECOFLEX™, TECOPHILIC™, TECOTHANE™, and TECOPLAST™ thermoplastic polyurethanes all available from the Lubrizol Corporation; ELASTOLLAN™ thermoplastic polyurethanes and other thermoplastic polyurethanes available from BASF; and additional thermoplastic polyurethane materials available from Bayer, Huntsman, Merquinsa and other suppliers.

The polyurethane component of the continuous resin phase used in the practice of the invention may contain a combination of two or more TPUs as described above.

The TPUs may be present in an amount from 10 to 89 wt % based on the total weight of the composition. The TPUs are typically present in an amount of at least 20 weight percent (wt. %), based on the total weight of the composition. This includes compositions that contain at least 30 wt. % TPU, based on the total weight of the composition. For example, in some embodiments, the compositions include about 20 to 70 wt. % TPU, about 30 to 50 wt. % TPU, or about 30 to 40 wt. % TPU.

Polar Olefin Polymers:

The halogen-free, TPU-based compositions can optionally include one or more additional polymers, such as polar polyolefins. These can be dispersed in, or co-continuous with, the continuous resin phase of the composition.

"Olefin polymer", "olefinic polymer", "olefinic interpolymer", "polyolefin", "olefin-based polymer" and like terms mean a polymer containing, in polymerized form, a majority weight percent of an olefin, for example ethylene or propylene, based on the total weight of the polymer. Thermoplastic polyolefins include both olefin homopolymers and interpolymers. "Interpolymer" means a polymer prepared by the polymerization of at least two different monomers. The interpolymers can be random, block, homogeneous, heterogeneous, etc. This generic term includes copolymers, usually employed to refer to polymers prepared from two different monomers, and polymers prepared from more than two different monomers, e.g., terpolymers, tetrapolymers, etc.

A "polar olefin polymer," is an olefin polymer containing one or more polar groups (sometimes referred to as polar functionalities). A "polar group," as used herein, is any group that imparts a bond dipole moment to an otherwise essentially nonpolar olefin molecule. Exemplary polar groups include carbonyls, carboxylic acid groups, carboxylic acid anhydrate groups, carboxylic ester groups, epoxy groups, sulfonyl groups, nitrile groups, amide groups, silane groups and the like. These groups can be introduced into the olefin-based polymer either through grafting or copolymerization. Nonlimiting examples of polar olefin-based polymers include ethylene/acrylic acid (EAA), ethylene/methacrylic acid (EMA), ethylene/acrylate or methacrylate, ethylene/vinyl acetate (EVA), poly(ethylene-co-vinyltrimethoxysilane) copolymer, maleic anhydrate- or silane-grafted olefin polymers, poly(tetrafluoroethylene-alt-ethylene) (ETFE), poly (tetrafluoro ethylene-co-hexafluoro-propylene) (FEP), poly (ethylene-co-tetrafluoroethylene-co-hexafluoropropylene (EFEP), poly(vinylidene fluoride) (PVDF), poly(vinyl fluoride) (PVF), and the like. Preferred polar olefin polymers include DuPont ELVAX™ ethylene vinyl acetate (EVA) resins, AMPLIFY™ ethylene ethyl acrylate (EEA) copolymer from The Dow Chemical Company, PRIMACOR™ ethylene/acrylic acid copolymers from The Dow Chemical Company, and SI-LINK™ poly(ethylene-co-vinyltrimethoxysilane) copolymer from The Dow Chemical Company.

EVA is a preferred polar olefin polymer. This includes copolymers of EVA with one or more comonomers selected from $C_1$ to $C_6$ alkyl acrylates, $C_1$ to $C_6$ alkyl methacrylates, acrylic acid and methacrylic acid.

When present, the polar olefin polymers are typically used in amounts ranging from 1 to 40 wt. % based on the total weight of the composition.

Non-Migrating Aromatic Phosphate FLame Retardants:

The halogen-free, flame-retardant compositions include at least one aromatic organic phosphate-based flame retardant compound, such as a phosphoric acid ester, having a melting point (determined by ASTM D3418) that is low enough that it melts under melt processing and extrusion temperatures (e.g., ≥150° C.), but high enough that it exists as a solid in the final molded product at room temperature (23° C.) and passes the non-migration test.

Non-migration tests are conducted with an assembly shown in FIG. 1. Two cables 102 composed of a composition in accordance with this invention are sandwiched between two plastic panels 104, which are further sandwiched between two glass panels 106 with a loading of 500 g 108 on top of the assembly. The plastic panels employed are PC, ABS, and PC/ABS. The cables are tested on each type of the three panels (i.e., three times—once each with each type of panel). The diameters of the cables are not critical. Cables having diameters of about 0.5 mm to about 10 mm can be used. The dimensions of each panel are 9 cm×6 cm. The two cables protrude past the pressing plate (width 60 mm). The assembly is then stored at 50° C., 80% RH for 48 hr. Then the plastic panels are cleaned with 90% ethanol. For the purposes of this disclosure, a composition passes the non-migration test if no residue or etching is observed on the PC, ABS, and PC/ABS panels after the test, as determined by visual inspection.

It is advantageous for the non-migrating aromatic organic phosphate-based flame retardant to exist as a liquid during extrusion so that it will operate as a lubricant. Thus, in some embodiments, the non-migrating aromatic organic phosphate-based flame retardant compound has a melting point of at least 50° C., at least 70° C., at least 80° C., or at least 100° C., at ambient conditions.

Examples of suitable non-migrating aromatic organic phosphate flame retardants include aromatic polyphosphates, such as high molecular weight resorcinol bis(diphenyl phosphate) (P-RDP) and resorcinol bis(dixylenyl phosphate) (XDP), the structures of which are shown below.

Chemical structure of RDP:

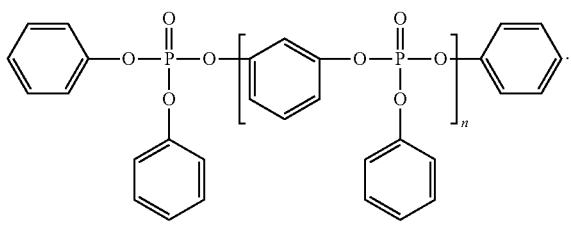

Chemical structure of XDP:

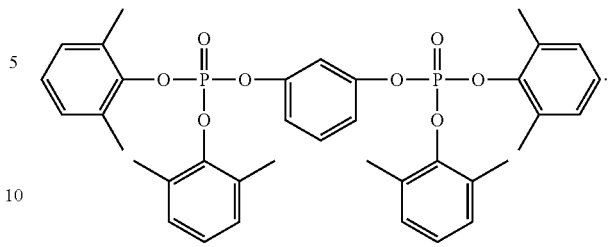

For the high molecular weight P-RDP, n can be, for example 23, and the molecular weight, Mw, can be 6000 to 7000.

The non-migrating, aromatic organic phosphate flame retardants are typically present in an amount of at least 1 wt. %, based on the total weight of the composition. This includes compositions that contain at least 5 wt. %, based on the total weight of the composition, of non-migrating, aromatic organic phosphate flame retardant. For example, in some embodiments, the compositions include about 1 to 10 wt. % non-migrating, aromatic organic phosphate flame retardant or about 2 to 8 wt. % non-migrating, aromatic organic phosphate flame retardant.

Inorganic Hydrates:

The inorganic hydrates in the present compositions impart flame retardant properties to the compositions. Suitable examples include, but are not limited to, metal hydroxides, such as aluminum trihydroxide (also known as ATH or aluminum trihydrate) and magnesium hydroxide (also known as magnesium dihydroxide). Inorganic hydrates of the present invention do not include calcium hydroxide, basic calcium carbonate, basic magnesium carbonate, hydrotalcite, huntite, and hydromagnesite, which are fillers.

The inorganic hydrates may be present in an amount from 10 to 89 wt. % based on the total weight of the composition. The inorganic hydrates are typically used in amounts of at least 10 wt. %, based on the total weight of the composition. This includes embodiments in which inorganic hydrates are used in amounts of at least 30 wt. %, based on the total weight of the composition. For example, in some embodiments, the inorganic hydrates are used in amounts of 30 to 50 wt. %, based on the total weight of the composition. This includes embodiments in which the inorganic hydrates are used in amounts of 30 to 40 wt. %, based on the total weight of the composition.

Liquid Organic Flame Retardants:

In addition to the non-migrating, aromatic organic phosphate flame retardants, the present composition can optionally include one or more liquid (at room temperature) organic phosphate flame retardants. These liquid organic phosphate flame retardants exist as liquids in molded articles made from the compositions at room temperature and/or have relatively low melting points such that they contribute to the flame-retardant migration in the molded articles. For example, these liquid organic phosphate flame retardants can be characterized by melting points (determined by ASTM D3418) of 25° C., or lower, at ambient conditions. The concentration of these liquid organic phosphate flame retardants in the compositions should be low, preferably lower than the concentration of the non-migrating aromatic phosphate flame retardants. Examples of liquid organic phosphate flame retardants that can optionally be included in the present compositions are aromatic polyphosphates, such as liquid RDP and bisphenol A diphosphate (BPADP) and monophosphate, such as tributoxy ethyl phosphate (TBEP), trimethyl phosphate (TMP) and triethyl phosphate (TEP).

In an embodiment the liquid organic flame retardant having a melting point of 25 C or less is bisphenol-A bis(diphenyl phosphate) (BDP). The structure of BDP is shown below.

Chemical structure of BDP:

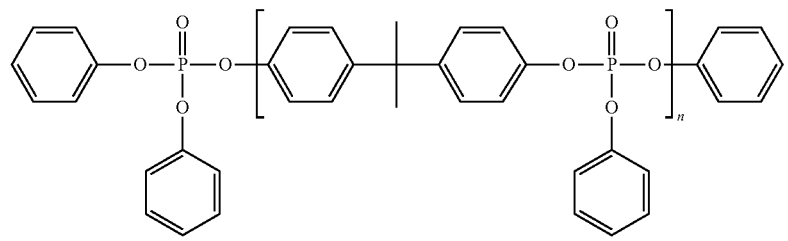

Other organic flame retardants that can be included in the present compositions include, phosphorus-based and nitrogen-based flame retardants. These include, but are not limited to, phosphoric acid salts, phosphonic acid salts, and nitrogen-containing flame retardants.

In some embodiments, the compositions are free of liquid (at room temperature) organic flame retardants. In other embodiments, the compositions include no greater than 10 wt. %, no greater than 8 wt. %, or no greater than 5 wt. %, based on the total weight of the composition, of liquid (at room temperature) organic flame retardants. For example, the compositions can include 1 to 10 wt. %, based on the total weight of the composition, of liquid (at room temperature) organic flame retardants. This includes embodiments in which the compositions include 2 to 8 wt. %, based on the total weight of the composition, of liquid (at room temperature) organic flame retardants.

Epoxidized Novolac Resins:

The present compositions can optionally include one or more char forming agents to prevent or minimize dripping during combustion. For example, some embodiments of the compositions include an epoxidized novolac resin as a char forming agent. An "epoxidized novolac resin," is the reaction product of epichlorohydrin and phenol novolac polymer in an organic solvent. Nonlimiting examples of suitable organic solvents include acetone, methyl ethyl ketone, methyl amyl ketone, and xylene. The epoxidized novolac resin may be a liquid, a semi-solid, a solid, and combinations thereof.

The epoxidized novolac resins are typically used in amounts ranging from 0.1 to 5 wt. %, based on the total weight of the composition. This includes embodiments in which the epoxidized novolac resins are used in amounts ranging from 1 to 3 wt. %, based on the total weight of the composition and further includes embodiments in which the epoxidized novolac resins are used in amounts ranging from 1.5 to 2.5 wt. %, based on the total weight of the composition.

Optional Additives and Fillers:

The compositions of this invention can, optionally, also contain additives and/or fillers. Representative additives include, but are not limited to, antioxidants, processing aids, colorants, ultraviolet stabilizers (including UV absorbers), antistatic agents, nucleating agents, slip agents, plasticizers, lubricants, viscosity control agents, tackifiers, anti-blocking agents, surfactants, extender oils, acid scavengers, and metal deactivators. These additives are typically used in a conventional manner and in conventional amounts, e.g., from 0.01 wt. % or less to 10 wt. % or more, based on the total weight of the composition.

Representative fillers include but are not limited to the various metal oxides, e.g., titanium dioxide; metal carbonates such as magnesium carbonate and calcium carbonate; metal sulfides and sulfates such as molybdenum disulfide and barium sulfate; metal borates such as barium borate, meta-barium borate, zinc borate and meta-zinc borate; metal anhydride such as aluminum anhydride; clay such as diatomite, kaolin and montmorillonite; huntite; celite; asbestos; ground minerals; and lithopone. These fillers are typically used a conventional manner and in conventional amounts, e.g., from 5 wt. % or less to 50 wt. % or more based on the weight of the composition.

Suitable UV light stabilizers include hindered amine light stabilizers (HALS) and UV light absorber (UVA) additives.

Examples of antioxidants include, but are not limited to, hindered phenols such as tetrakis [methylene(3,5-di-tert-butyl-4-hydroxyhydro-cinnamate)]methane; bis [(beta-(3,5-di-tert-butyl-4-hydroxybenzyl)-methylcarboxyethyl)]sulphide, 4,4'-thiobis(2-methyl-6-tert-butylphenol), 4,4'-thiobis(2-tert-butyl-5-methylphenol), 2,2'-thiobis(4-methyl-6-tert-butylphenol), and thiodiethylene bis(3,5-di-tert-butyl-4-hydroxy)hydrocinnamate; phosphites and phosphonites such as tris(2,4-di-tert-butylphenyl)phosphite and di-tert-butylphenyl-phosphonite; thio compounds such as dilaurylthiodipropionate, dimyristylthiodipropionate, and distearylthiodipropionate; various siloxanes; polymerized 2,2,4-trimethyl-1,2-dihydroquinoline, n,n'-bis(1,4-dimethylpentyl-p-phenylenediamine), alkylated diphenylamines, 4,4'-bis(alpha,alpha-dimethylbenzyl)diphenylamine, diphenyl-p-phenylenediamine, mixed di-aryl-p-phenylenediamines, and other hindered amine anti-degradants or stabilizers.

Examples of processing aids include, but are not limited to, metal salts of carboxylic acids such as zinc stearate or calcium stearate; fatty acids such as stearic acid, oleic acid, or erucic acid; fatty amides such as stearamide, oleamide, erucamide, or N,N'-ethylene bis-stearamide; polyethylene wax; oxidized polyethylene wax; polymers of ethylene oxide; copolymers of ethylene oxide and propylene oxide; vegetable waxes; petroleum waxes; non ionic surfactants; silicone fluids and polysiloxanes.

Composition Properties:

The compositions can be characterized by their resistance to migration, as well as their good mechanical and flame-retardant properties.

Non-Migration:

Migration testing of cables made from the present compositions is carried out at 50° C. and 80% relative humidity for 48 hours using the set-up described in the example, below ("the non-migration test").

Heat Deformation:

Wires coated with some embodiments of the present compositions generally exhibit a heat deformation ratio of less than 30% at 150° C. with a 350 gram load (3.5±0.2 N) according to UL 1581-2001. In some embodiments, the coated wires exhibit a heat deformation of no greater than 25 percent or even no greater than 20 percent, measured at 150° C. with a 350 gram load (3.5±0.2 N) according to UL 1581-2001.

Flame Retardance:

Wires coated with some embodiments to of the compositions pass the UL VW-1 flame rating. "VW-1" is an Underwriters' Laboratory (UL) flame rating for wire and sleeving. It denotes "Vertical Wire, Class 1", which is the highest flame rating a wire or sleeve can be given under the UL 1441 specification. The test is performed by placing the wire or sleeve in a vertical position. A flame is set underneath it for a period of time, and then removed. The characteristics of the sleeve are then noted. The VW-1 flame test is determined in accordance with method 1080 of UL-1581.

Tensile Strength and Elongation at Break:

The present compositions can be characterized by their tensile strength at break (in MPa) and elongation at break (%). Tensile strength and elongation can be measured in accordance with the ASTM D-638 testing procedure on compression molded samples prepared according to ASTM D4703. Elongation at break, or elongation to break, is the strain on a sample when it breaks. It usually is expressed as a percent.

Some embodiments of the present compositions have tensile strengths at break of at least 10 MPa. This includes compositions having tensile strength at break of at least 12 MPa and further includes compositions having a tensile strength at break of at least 15 MPa.

Some embodiments of the present compositions have an elongation at break of at least 200%. This includes compositions having an elongation at break of at least 300%, and further includes compositions having an elongation at break of at least 320%.

Melt Flow Rates:

Melt Flow Rate (MFR) is measured according to ASTM D 1238-04, Procedure C, Condition 190° C./2.16 kg. Some embodiments of the compositions have an MFR of at least 10 g/10 min. This includes compositions having an MFR of at least 12 g/10 min.

Compounding:

The compositions can be formed by mixing the TPU, any additional polymers, the inorganic hydrate, the non-migrating phosphate flame retardant and any additional organic flame retardants, epoxidized novolac resins, additives and fillers. The mixing can take place in a step-wise fashion or in a single step and can be carried out in a conventional tumbling device. The compositions can be compounded at a temperature above the melting point of the non-migrating phosphate flame retardants.

Compounding of the compositions can be effected by standard compounding equipment. Examples of compounding equipment are internal batch mixers, such as a Banbury™ or Bolling™ internal mixer. Alternatively, continuous single, or twin screw, mixers can be used, such as a Farrel™ continuous mixer, a Werner and Pfleiderer™ twin screw mixer, or a Buss™ kneading continuous extruder. The type of mixer utilized, and the operating conditions of the mixer, will affect properties of the composition such as viscosity, volume resistivity, and extruded surface smoothness. The resulting compositions are desirably capable of being molded and shaped into an article, such as a wire jacket, profile, sheet or pellet for further processing.

Articles:

Another aspect of the invention provides articles, such as molded or extruded articles, comprising one or more compositions of the present invention.

Articles include wire and cable jackets and insulation. Thus, in some embodiments, the article includes a metal conductor and a coating on the metal conductor to provide an "insulated" wire capable of electrical transmission. A "metal conductor," as used herein, is at least one metal component used to transmit either electrical power and/or electrical signals. Flexibility of wire and cables is often desired, so the metal conductor can have either a solid cross-section or preferentially can be composed of smaller wire strands that provide increased flexibility for the given overall conductor diameter. Cables are often composed of several components such as multiple insulated wires formed into an inner core, and then surrounded by a cable sheathing system providing protection and cosmetic appearance. The cable sheathing system can incorporate metallic layers such as foils or armors, and typically has a polymer layer on the surface. The one or more polymer layers incorporated into the protective/cosmetic cable sheathing are often referred to as cable "jacketing". For some cables, the sheathing is only a polymeric jacketing layer surrounding a cable core. There are also some cables having a single layer of polymer surrounding the conductors, performing both the roles of insulation and jacketing. The present compositions may be used as, or in, the polymeric components in a full range of wire and cable products, including power cables and both metallic and fiber optic communication applications. A cable containing an insulation layer comprising a composition of this invention can be prepared with various types of extruders, e.g., single or twin screw types.

The following examples illustrate various embodiments of this invention. All parts and percentages are by weight unless otherwise indicated.

SPECIFIC EMBODIMENTS

The following examples illustrate embodiments of methods for making thermoplastic compositions in accordance with the present invention.

Materials:

The TPUs used in this example are polytetramethylene glycol ether TPU (PELLETHANE™ 2103-90AE from Lubrizol Advanced Materials; TPU-1) and an ether based TPU (ESTANE® 58219 from Lubrizol Advanced Materials, TPU-2). Before using, the TPU samples are pre-dried at 90° C. for at least 6 hrs under vacuum.

Aluminum hydroxide (ATH) is used as the inorganic hydrate (grade H42M, from Showa Chemical).

Resorcinol bis(diphenyl phosphate) (RDP) (grade Fyrolflex® RDP from Supresta) is used in comparative example 1 and bis(diphenyl phosphate) (BDP) (obtained from Adeka with grade name FP600) is used as received in comparative example 2 and inventive examples 3-5.

The non-migrating aromatic organic phosphate flame retardants used in the inventive examples are resorcinol bis (dixylenyl phosphate) (PX-200×PD from Daihachi Chemical) and high molecular weight powder RDP (p-RDP from Yoke Chemical) which is a solid at room temperature, having a melting point of 55-60° C. and an Mw of 6000 g/mol with an average n value of 23.

The examples include an epoxy novolac (DEN438 from Dow Chemical Company) and the following additives/fillers: (1) tetrafluoroethylene-co-styrene-co-acrylonitrile (grade AD001 from Daikin); (2) $TiO_2$ (R350 from DuPont); (3) an anti-oxidants (Irganox 1010 from Ciba Specialty Chemicals; Irgafos 126 from Ciba Specialty Chemicals; and Irgafos MD1024 from Ciba Specialty Chemicals); (4) a processing stabilizer (Irgafos 168 from Ciba Specialty Chemicals; (5) a UV stabilizer (Tinuvin 866 from Ciba Specialty Chemicals); and a color match additive (Clariant MB from Clariant).

Methods:

The compositions shown in Table A are prepared on a twin screw extruder and evaluated for extrusion characteristics and key properties. Both Comparative Examples (CEs) and Inventive Examples (IEs) are shown. The following steps are used in the material preparation and evaluation. In a 50 L high speed mixer, all of the TPU resin and a portion of the aluminum oxide trihydrate filler is added and mixed for 10 seconds. The remaining aluminum oxide trihydrate is then added to the mixture, together with the solid phosphates (XDP or p-RDP) and, if present, the liquid phosphates (BDP and RDP). Preheated epoxidized novolac is gradually spooned into the mixer. Then the Irganox 1010 and Irgafos 168 additives are added.

Once all the components are added to the mixer, they are mixed under 1800 RPM for 1 minute. The pre-mixed blends are then extruded by a twin screw extruder with a barrel temperature of 170° C., a screw diameter of 35.5 mm and an L/D at 38.6, with an output about 20 kg/hr. Finally, the resulting pellets dried under 120° C. for 6 hrs.

Heat deformation testing is conducted according to UL 1581-2001. For each formulation, two parallel sample plaques are placed into an oven and preheated at 150° C. for one hour. The preheated samples are then pressed with the same loading at 150° C. for one hour. After that the pressed samples, without removal of the weights, are placed in an ASTM room with setting temperature at 23° C. for an additional hour. The changes in the thickness of the sample plaques are recorded and the heat deformation ratio is calculated according to HD %=$(D_0-D_1)/D_0$*100%, wherein $D_0$ represents the original sample thickness and $D_1$ represents the sample thickness after the deformation process. Calculated deformation ratios for the two parallel samples are averaged.

Non-migration tests are conducted as described above. For the purposes of this disclosure, a composition passes the non-migration test if no residue or etching is observed on the PC, ABS, and PC/ABS panels after the test, as determined by visual inspection.

Environmental testing conditions for data cable use typical test points of 1) 65° C., uncontrolled humidity, 2) 40° C., 90% RH, and 3) −40° C., uncontrolled humidity. First a baseline inspection is made. Then the cable is placed in a test chamber

TABLE A

| | Formulations (proportions in weight %) | | | | | | | | |
|---|---|---|---|---|---|---|---|---|---|
| | CE 1 | CE 2 | IE 1 | IE 2 | IE 3 | IE 4 | IE 5 | IE 6 | IE 7 |
| TPU-1 | 33.03 | 33.03 | 0.00 | 33.03 | 0.00 | 0.00 | 0.00 | 0.00 | 0.00 |
| TPU-2 | 0.00 | 0.00 | 33.03 | 0.00 | 33.03 | 33.03 | 33.03 | 33.03 | 33.03 |
| ATH | 39.69 | 39.69 | 39.69 | 39.69 | 39.69 | 39.69 | 39.69 | 39.69 | 39.69 |
| RDP | 13.04 | 0.00 | 0.00 | 0.00 | 0.00 | 0.00 | 0.00 | 0.00 | 0.00 |
| BDP | 0.00 | 13.04 | 0.00 | 0.00 | 2.00 | 2.00 | 6.50 | 6.5 | 6.5 |
| PX-200 | 0.00 | 0.00 | 13.04 | 0.00 | 11.04 | 0.00 | 6.50 | 6.5 | 0.00 |
| P-RDP | 0.00 | 0.00 | 0.00 | 13.04 | 0.00 | 11.04 | 0.00 | 0.00 | 6.5 |
| DEN 438 | 1.74 | 1.74 | 1.74 | 1.74 | 1.74 | 1.74 | 0.86 | 1.74 | 1.74 |
| AD-001 | 0.06 | 0.06 | 0.06 | 0.06 | 0.06 | 0.06 | 0.06 | 0.06 | 0.06 |
| 168 | 0.09 | 0.09 | 0.09 | 0.09 | 0.09 | 0.09 | 0.09 | 0.09 | 0.09 |
| 1010 | 0.52 | 0.52 | 0.52 | 0.52 | 0.52 | 0.52 | 0.52 | 0.52 | 0.52 |
| TiO2 | 8.9 | 8.9 | 8.9 | 8.9 | 8.9 | 8.9 | 8.90 | 8.9 | 8.9 |
| UV886 | 1.00 | 1.00 | 1.00 | 1.00 | 1.00 | 1.00 | 1.00 | 1.0 | 1.0 |
| Clariant MB | 1.93 | 1.93 | 1.93 | 1.93 | 1.93 | 1.93 | 2.00 | 1.93 | 1.93 |
| Sum | 100.00 | 100.00 | 100.00 | 100.00 | 100.00 | 100.00 | 100.00 | 100.00 | 100.00 |
| VW-1 | Pass | Pass | Pass | Pass | Pass | Pass | Pass | Pass | Pass |
| Tensile Elongation, % | 367 | 342 | 336 | 303 | 318 | 228 | 322 | 290 | 340 |
| Tensile Strength, MPa | 12.74 | 15.25 | 16.35 | 13.64 | 16.1 | 14.3 | 15.2 | 13.7 | 12.61 |
| MFR (190° C., 2.16 kg) | 10.55 | 7.94 | 9.30 | 12.80 | 6.00 | 10.12 | 12.50 | 9.72 | 10.3 |
| Heat Deformation, % | 42 | 32 | 11 | 30 | 17 | 16 | 16 | 15 | 20 |
| Non-migration test | Fail | Fail | Pass | Pass | Pass | Pass | Pass | Pass | Pass |
| Environmental Test | Pass | Pass | Fail | Fail | nm | nm | nm | Pass | Pass | nm = not measured

Characterization:

The tensile strength at break and the elongation at break are measured according to ASTM D-638 at room temperature and a speed of 50 mm/min. The tensile testing is performed on a INSTRON 5565 Tensile Tester. The specimen for the tensile tests are compression molded plaques prepared at a 185° C. molding temperature, using a low pressure cycle to facilitate melting, followed by exposure to high pressure to shape the 1.4×200×200 mm plaques. The mold is held at high pressure (15 MPa) and cooled to room temperature over a period of 8 min to solidify the plaques.

VW-1 testing is conducted in a VW-1 chamber according to UL 1581-2001.

at ambient conditions after which the chamber conditions conform to testing point 1. The cable dwells at test point 1 for 72 hours after which the chamber conditions return to ambient conditions for a minimum of one hour. A baseline inspection is performed to note any chances or abnormalities caused by the test. The process is repeated for each testing point.

Results:

Comparative example (CE) 1 uses only liquid (having a melting point of less than 25° C.) organic flame retardant RDP as the phosphate-based flame retardant and comparative example 2 uses only liquid organic flame retardant BDP as the phosphate-based flame retardant. These two comparative examples, which are made only with liquid organic phosphate flame retardants, fail the non-migration test, resulting in heavy etching on all the plastic panels.

In comparison, inventive examples (IE) 1 and 2, in which the liquid organic flame retardants RDP and BDP are replaced by a non-migrating, solid (having a melting point of at least 50° C.) aromatic organic phosphate flame retardants (PX-200 or P-RDP), pass the non-migration test. At least equivalent burning performance and mechanical properties, relative to the comparative examples, are obtained. However, inventive examples 1 and 2 fail the environmental test due to powder residue on the cable surface after the environmental testing.

Inventive examples 3 and 4 employ 2% liquid organic flame retardant (BDP) and 11.04% solid aromatic organic phosphate flame retardants (PX-200 or P-RDP) as the phosphate-based flame retardant. The two compositions also pass the non-migration test. At least equivalent burning performance and mechanical properties, relative to the comparative examples, are obtained.

Inventive example 5 employs 6.5% liquid organic flame retardant (BDP) and 6.5% solid aromatic organic phosphate flame retardant (PX-200) as the phosphate-based flame retardant. IE 5 employs 0.86% DEN 438, an epoxy novolac, compared to CE 1-2 and IE 1-4, which all use 1.74% DEN 438. IE 5 passes the non-migration test. At least equivalent burning performance and mechanical properties, relative to the comparative examples, are obtained.

Inventive examples 6 and 7 employ 6.5% liquid organic flame retardant (BDP) and 6.5% solid aromatic organic phosphate flame retardants (PX-200 or P-RDP) as a flame retardant, which pass both the non-migration test and the environmental test. Equivalent burning performance and mechanical properties were obtained. Note, inventive examples 6 and 7 employ 1.74% DEN 438.

The results of these examples show advantageous results for using solid aromatic organic phosphate flame retardants as the flame retardant. More advantageous results are obtained from using the solid aromatic organic phosphate flame retardants in combination with liquid organic flame retardants.

All references to the Periodic Table of the Elements refer to the Periodic Table of the Elements published and copyrighted by CRC Press, Inc., 2003. Also, any references to a Group or Groups shall be to the Group or Groups reflected in this Periodic Table of the Elements using the IUPAC system for numbering groups. Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of synthetic techniques, product and processing designs, polymers, catalysts, definitions (to the extent not inconsistent with any definitions specifically provided in this disclosure), and general knowledge in the art.

The numerical ranges in this disclosure are approximate unless otherwise indicated. Numerical ranges include all values from and including the lower and the upper values, in increments of one unit, provided that there is a separation of at least two units between any lower value and any higher value. As an example, if a compositional, physical or other property, such as, for example, tensile strength, elongation at break, etc., is from 100 to 1,000, then the intent is that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure.

"Ambient conditions" refers to conditions of 25° C. and 100 kPa.

As used with respect to a chemical compound, unless specifically indicated otherwise, the singular includes all isomeric forms and vice versa (for example, "hexane", includes all isomers of hexane individually or collectively). The terms "compound" and "complex" are used interchangeably to refer to organic-, inorganic- and organometal compounds.

The term "or", unless stated otherwise, refers to the listed members individually as well as in any combination.

Although the invention has been described in considerable detail through the preceding description, drawings and examples, this detail is for the purpose of illustration. One skilled in the art can make many variations and modifications without departing from the spirit and scope of the invention as described in the appended claims.

What is claimed is:

1. A halogen-free flame retardant composition comprising:
   (a) 10 to 89 weight percent, based on the total weight of the composition, of a continuous resin phase comprising a thermoplastic polyurethane;
   (b) 1 to 10 weight percent, based on the total weight of the composition, of an aromatic organic phosphate flame retardant having a melting point of at least 50° C.; and
   (c) 10 to 89 weight percent, based on the total weight of the composition, of an inorganic hydrate flame retardant;
   the composition comprising no greater than 10 weight percent, based on the total weight of the composition, of a liquid organic flame retardant having a melting point of 25° C. or lower.

2. The composition of claim 1, further comprising:
   (d) 1 to 10 weight percent, based on the total weight of the composition, of a liquid organic flame retardant having a melting point of 25° C. or lower.

3. The halogen-free flame-retardant composition of claim 2 comprising:
   (a) 20 to 50 weight percent, based on the total weight of the composition, of the continuous resin phase comprising a thermoplastic polyurethane;
   (b) 2 to 8 weight percent, based on the total weight of the composition, of the aromatic organic phosphate flame retardant having is melting point of at least 50° C.;
   (c) 30 to 50 weight percent, based on the total weight of the composition, of the inorganic hydrate flame retardant; and
   (d) 2 to 8 weight percent, based on the total weight of the composition, of the liquid organic flame retardant having a melting point of 25° C. or lower.

4. The composition of claim 3, wherein:
   the aromatic organic phosphate flame retardant is resorcinol bis(dixylenyl phosphate) (XDP) or high molecular weight resorcinol bis(diphenylphosphate) (p-RDP),
   the inorganic hydrate flame retardant is aluminum trihydroxide (ATH), and
   the liquid organic name retardant having a melting point of 25° C. or lower is bisphenol-A bis(diphenyl phosphate) (BDP).

5. The composition of claim 2, wherein the weight percent of liquid organic flame retardants having a melting point of 25° C. or lower is equal to, or lower than the weight percent of the aromatic organic phosphate flame retardant having a melting point of at least 50° C.

6. The composition of claim 1, in which the composition is free of liquid organic flame retardant having a melting point of 25° C. or lower.

7. The composition of claim 1, characterized in that a cable consisting of the composition does not exhibit migration after 48 hours at 50° C. and 80% relative humidity.

8. The composition of claim 1 having a heat deformation ratio, as measured b UL 1581-2001, of no greater than 20%.

9. The composition Of claim 2, further comprising an epoxidized novolac resin.

10. A jacketing or insulation layer for a wire or cable comprising the composition of claim 1.

11. The composition of claim 1, wherein the aromatic organic phosphate flame retardant has a melting point of from 55° C. to 60° C.

12. The composition of claim 1, wherein the aromatic organic phosphate flame retardant has a melting point of at least 70° C.

13. The composition of claim 4, wherein the high molecular weight resorcinol bis(diphenylphosphate) (p-RDP) has a molecular weight, Mw, of from 6000 to 7000 g/mol.

\* \* \* \* \*